US011874617B2

(12) United States Patent
Kubo et al.

(10) Patent No.: US 11,874,617 B2
(45) Date of Patent: Jan. 16, 2024

(54) ENDLESS BELT, TRANSFER DEVICE, AND IMAGE FORMING APPARATUS

(71) Applicant: FUJIFILM Business Innovation Corp., Tokyo (JP)

(72) Inventors: Yosuke Kubo, Kanagawa (JP); Hiroaki Tanaka, Kanagawa (JP); Shigeru Fukuda, Kanagawa (JP); Kenta Yamakoshi, Kanagawa (JP); Masato Ono, Kanagawa (JP); Masato Furukawa, Kanagawa (JP); Daisuke Tanemura, Kanagawa (JP); Masayuki Seko, Kanagawa (JP); Koichi Matsumoto, Kanagawa (JP); Iori Nishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/950,492

(22) Filed: Sep. 22, 2022

(65) Prior Publication Data

US 2023/0297008 A1 Sep. 21, 2023

(30) Foreign Application Priority Data

Mar. 15, 2022 (JP) ................................ 2022-040309

(51) Int. Cl.

| | |
|---|---|
| ***G03G 15/16*** | (2006.01) |
| ***G03G 15/20*** | (2006.01) |
| ***G03G 15/01*** | (2006.01) |

(52) U.S. Cl.

CPC ....... *G03G 15/162* (2013.01); *G03G 15/0131* (2013.01); *G03G 15/1605* (2013.01); *G03G 15/1685* (2013.01); *G03G 15/2057* (2013.01); *G03G 2215/1623* (2013.01)

(58) Field of Classification Search

CPC ........... G03G 15/0131; G03G 15/1605; G03G 15/162; G03G 15/1685; G03G 15/2057; G03G 2215/1623

See application file for complete search history.

(56) References Cited

U.S. PATENT DOCUMENTS

| | | | | |
|---|---|---|---|---|
| 10,656,567 B1 * | 5/2020 | Igarashi | ............... | G03G 9/0827 |
| 10,831,133 B1 | 11/2020 | Sugiura et al. | | |
| 2014/0008585 A1 * | 1/2014 | Wu | ...................... | G03G 15/162<br>252/511 |
| 2022/0146966 A1 * | 5/2022 | Ono | ..................... | G03G 15/162 |

FOREIGN PATENT DOCUMENTS

| | | |
|---|---|---|
| JP | 2021-092598 A | 6/2021 |

* cited by examiner

*Primary Examiner* — Joseph S Wong
(74) *Attorney, Agent, or Firm* — Sughrue Mion, PLLC

(57) ABSTRACT

An endless belt includes a resin, and particles having an average primary particle diameter of 8 nm or more and 20 nm or less. In a volume frequency distribution of the particles determined by small-angle X-ray scattering measurement, the ratio (area B/area A) of graph area B of a particle diameter region of over 35 nm to graph area A of a particle diameter region of 35 nm or less is 0.3 or less.

20 Claims, 2 Drawing Sheets

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-040309 filed Mar. 15, 2022.

BACKGROUND

(i) Technical Field

The present disclosure relates to an endless belt, a transfer device, and an image forming apparatus.

(ii) Related Art

Japanese Unexamined Patent Application Publication No. 2021-92598 proposes an endless belt containing a first resin and first conductive carbon particles, in which in a space distribution of the first conductive carbon particles present in an evaluation region of 6.3 μm×4.2 μm of the outer peripheral surface, the statistics L(r) integrated value represented by formula (1) in Japanese Unexamined Patent Application Publication No. 2021-92598 is 0 or more and 0.1 or less with a distance r between particles of 0.05 μm or more and 0.30 μm or less.

SUMMARY

Aspects of non-limiting embodiments of the present disclosure relate to a single-layer type endless belt containing a resin and particles having an average primary particle diameter of 8 nm or more and 20 nm or less, and when a voltage is applied, the endless belt suppresses local discharge as compared with when in a volume frequency distribution of particles determined by small-angle X-ray scattering measurement, the ratio (area B/area A) of graph area B of a particle diameter region of over 35 nm to graph area A of a particle diameter region of 35 nm or less exceeds 0.3 or when in a cumulative undersize volume distribution of particles determined by small-angle X-ray scattering measurement, the ratio of particles with a particle diameter of 35 nm or less is less than 70% by volume.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an endless belt containing a resin and particles having an average primary particle diameter of 8 nm or more and 20 nm or less, wherein in a volume frequency distribution of the particles determined by small-angle X-ray scattering measurement, the ratio (area B/area A) of graph area B of a particle diameter region of over 35 nm to graph area A of a particle diameter region of 35 nm or less is 0.3 or less.

BRIEF DESCRIPTION OF THE DRAWINGS

Exemplary embodiments of the present disclosure will be described in detail based on the following figures, wherein.

DETAILED DESCRIPTION

Figure 1:
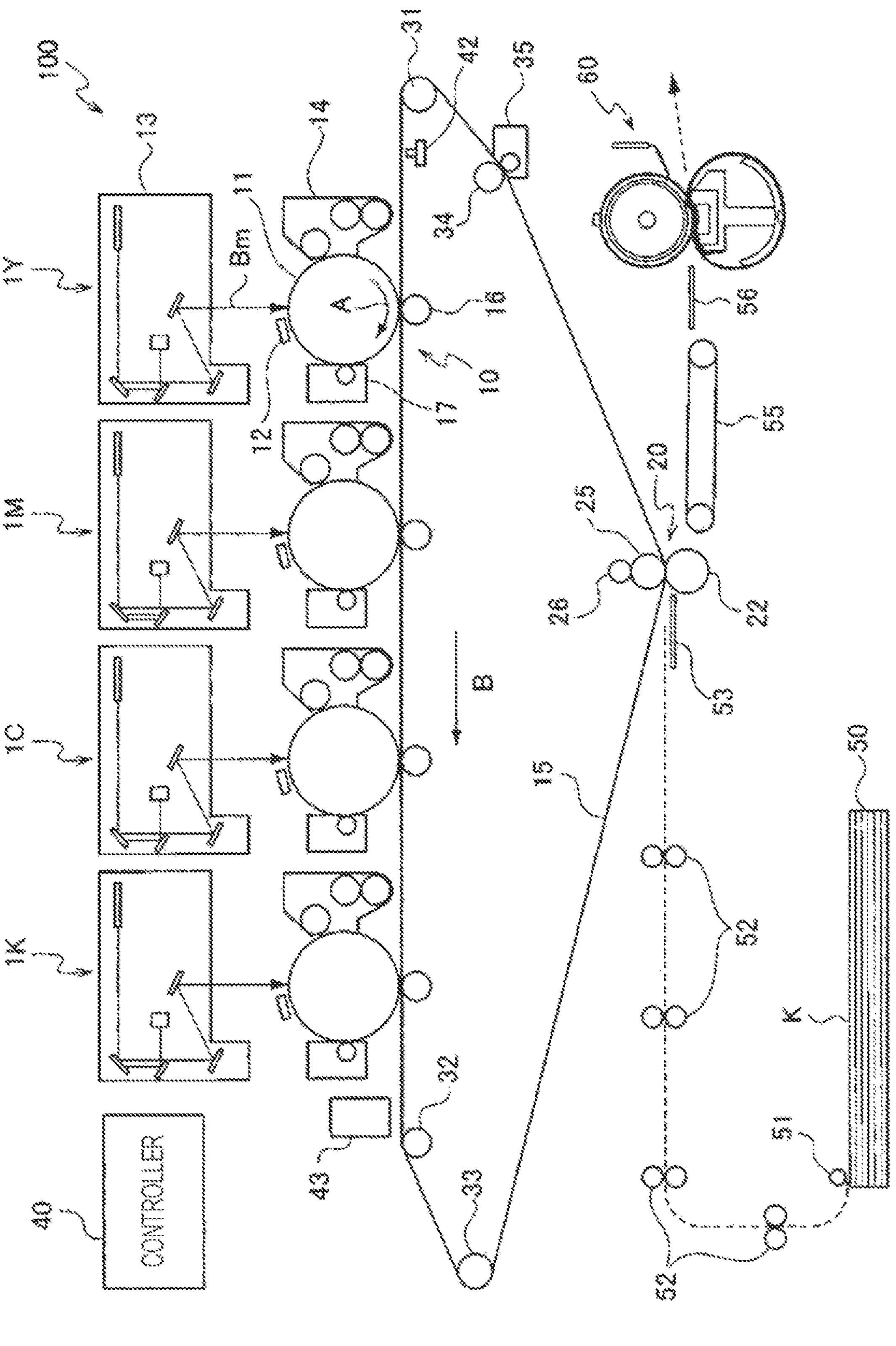
FIG. 1 is a schematic configuration diagram showing an image forming apparatus according to an exemplary embodiment of the present disclosure.

An exemplary embodiment of the present disclosure is described below. The description and examples illustrate the present disclosure, and the scope of the present disclosure is not limited.

In the numerical ranges stepwisely described in the present specification, the upper limit value or the lower limit value described in one of the numerical ranges may be replaced by the upper limit value or the lower limit value in another numerical range stepwisely described. In addition, in a numerical range described in the present specification, the upper limit value or the lower limit value of the numerical range may be replaced by the value described in an example.

In addition, each component may contain plural materials corresponding to the component.

In description of the amount of each of the components in a composition, when plural materials corresponding to each of the components are present in a composition, the amount of each of the components represents the total amount of the plural materials present in the composition unless otherwise specified.

In the specification, the term "process" includes not only an independent process but also even a process which cannot be distinguished from another process as long as the initial object of the process is achieved.

<Endless Belt>

An endless belt according to a first exemplary embodiment of the present disclosure is a single-layer type endless belt containing a resin and particles having an average primary particle diameter of 8 nm or more and 20 nm or less.

In addition, in a volume frequency distribution of particles determined by small-angle X-ray scattering measurement, the ratio (area B/area A) of graph area B of a particle diameter region of over 35 nm to graph area A of a particle diameter region of 35 nm or less is 0.3 or less.

The endless belt according to the first exemplary embodiment has the configuration described above and thus suppresses local discharge when a voltage is applied. The reason for this is supposed as follow.

A single-layer type endless belt containing a resin and particles having an average primary particle diameter of 8 nm or more and 20 nm or less may cause local discharge when a voltage is applied, and thus a current may flow through a portion other than the intended conductive path. This is considered to be due to containing large-diameter particles (also referred to as "coarse particles" hereinafter) in the endless belt. It is also considered that when coarse particles are present in the conductive path, local discharge occurs starting from the coarse particles.

In the endless belt according to the first exemplary embodiment, in a volume frequency distribution of particles determined by small-angle X-ray scattering measurement, the ratio (area B/area A) of graph area B of a particle diameter region of over 35 nm to graph area A of a particle diameter region of 35 nm or less is 0.3 or less. With the ratio (area B/area A) within the range described above, the ratio of particles having a particle diameter of 35 nm or less is increased. Therefore, the ratio of coarse particles contained in the endless belt is decreased, and thus the occurrence of local discharge starting from the coarse particles is suppressed.

Therefore, it is considered that when a voltage is applied, the endless belt according to the exemplary embodiment suppresses local discharge.

An endless belt according to a second exemplary embodiment of the present disclosure is a single-layer type endless belt containing a resin and particles having an average primary particle diameter of 8 nm or more and 20 nm or less.

In addition, when in a cumulative undersize volume distribution of particles determined by small-angle X-ray scattering measurement, the ratio of particles with a particle diameter of 35 nm or less is 70% by volume or more.

The endless belt according to the second exemplary embodiment has the configuration described above and thus suppresses local discharge when a voltage is applied. The reason for this is supposed as follow.

In the endless belt according to the second exemplary embodiment, when in a cumulative undersize volume distribution of particles determined by small-angle X-ray scattering measurement, the ratio of particles with a particle diameter of 35 nm or less is 70% by volume or more. When the ratio of particles having a particle diameter of 35 nm or less is within the range described above, the ratio of particles having a particle diameter of 35 nm or less is increased. Therefore, the ratio of coarse particles contained in the endless belt is decreased, and thus the occurrence of local discharge starting from the coarse particles is suppressed.

Therefore, it is considered that when a voltage is applied, the endless belt according to the second exemplary embodiment suppresses local discharge.

The endless below corresponding to any one of endless belts according to the first or second exemplary embodiment is described in detail below. However, an example of the endless belt according to the exemplary embodiment may be any one of endless belts according to the first or second exemplary embodiment.

(Resin)

Examples of the resin contained in the endless belt include, but are not particularly limited to, a polyimide resin (PI resin), a polyamide-imide resin (PAI resin), an aromatic polyether ketone resin (for example, an aromatic polyether ether ketone resin or the like), a polyphenylene sulfide resin (PPS resin), a polyether imide resin (PEI resin), a polyester resin, a polyamide resin, a polycarbonate resin, and the like.

From the viewpoint of mechanical strength and particle dispersibility, the resin preferably contains at least one selected from the group including a polyimide resin, a polyamide-imide resin, an aromatic polyether ether ketone resin, a polyether imide resin, and a polyphenylene sulfide resin, and more preferably contains at least one selected from the group including a polyimide resin and a polyamide-imide resin. Among these, a polyimide resin is still more preferred from the viewpoint of dispersibility of particles.

The resin may be one type of resin or a mixture of two or more types of resins.

-Polyimide Resin-

The polyimide resin is, for example, an imidized product of polyamic acid (precursor of a polyimide resin) which is a polymer of tetracarboxylic dihydride and diamine compound.

The polyimide resin is, for example, a resin having a structural unit represented by general formula (1) below.

General formula (1)

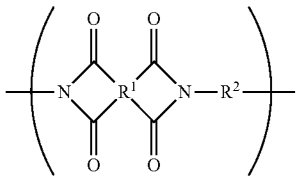

In the general formula (1), $R^1$ represents a tetravalent organic group, and $R^2$ represents a divalent organic group.

Examples of the tetravalent organic group represented by $R^1$ include an aromatic group, an aliphatic group, an alicyclic group, a combined group of an aromatic group and an aliphatic group, and substituted groups thereof. A specific example of the tetravalent organic group is a reside of tetracarboxylic dianhydride described later.

Examples of the divalent organic group represented by $R^2$ include an aromatic group, an aliphatic group, an alicyclic group, a combined group of an aromatic group and an aliphatic group, and substituted groups thereof. A specific example of the divalent organic group is a reside of a diamine compound described later.

Examples of tetracarboxylic dianhydride used as a raw material of the polyimide resin include pyromellitic dianhydride, 3,3',4,4'-benzophenone tetracarboxylic dianhydride, 3,3',4,4'-biphenyl tetracarboxylic dianhydride, 2,3,3',4-biphenyl tetracarboxylic dianhydride, 2,3,6,7-naphthalene tetracarboxylic dianhydride, 1,2,5,6-naphthalene tetracarboxylic dianhydride, 1,4,5,8-naphthalene tetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, ethylene tetracarboxylic dianhydride, and the like.

Examples of a diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tertiary butyl)toluene, bis(p-β-amino-tertiary butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyl tetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diamino-eicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

-Polyamide-Imide Resin-

The polyamide-imide resin is, for example, a resin having an imide bond and an amide bond as repeating units.

A more specific example of the polyamide-imide resin is a polymer of a trivalent carboxylic acid compound (also referred to as "tricarboxylic acid") having an acid anhydride group and a diisocyanate compound or diamine compound.

Preferred examples of tricarboxylic acid include trimellitic anhydride and derivatives thereof. The tricarboxylic acid may be used in combination with tetracarboxylic dianhydride, aliphatic dicarboxylic acid, aromatic dicarboxylic acid, or the like.

Examples of diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, naphthalene-2,6-diisocyanate, and the like.

The diamine compound is, for example, a compound having the same structure as the isocyanate described above, but having an amino group in place of an isocyanate group.

-Aromatic Polyether Ketone Resin-

The aromatic polyether ketone resin is, for example, a resin having aromatic rings, such as benzene rings, linearly bonded to each other through an ether bond and a ketone bond.

Examples of the aromatic polyether ketone resin include polyether ketone (PEK) having an ether bond and a ketone bond which are alternately arranged, polyether-ether ketone (PEEK) having an ether bond, an ether bond, and a ketone bond which are arranged in that order, polyether ketone (PEKK) having an ether bond, a ketone bond, and a ketone bond which are arranged in that order, polyether ether ketone ketone (PEEKK) having an ether bond, an ether bond, a ketone bond, and a ketone bond which are arranged in that order, polyether ketone ester having an ester bond, and the like.

The content of the resin relative to the whole of the endless belt is, for example, 60% by mass or more and 86% by mass or less, preferably 66% by mass or more and 82% by mass or less, and more preferably 70% by mass or more and 76% by mass or less.

(Particle)

The endless belt contains the particles having an average primary particle diameter of 8 nm or more and 20 nm or less.

The particles are not particularly limited, and are, for example, inorganic particles and resin particles.

From the viewpoint that a current more easily flows through the intended conductive path and local discharge is more suppressed when a voltage is applied, the particles are preferably conducti particles.

Examples of the conductive particles include particles containing carbon black, a metal (for example, aluminum, nickel, or the like), a metal oxide (for example, yttrium oxide, tin oxide, or the like), an ionic conductive material (for example, potassium titanate, LiCl, or the like), or the like. From the viewpoint of decreasing the ratio of coarse particles contained in the endless belt, particles containing carbon black are preferred.

The types of conductive particles may be used alone or in combination of two or more.

Examples of carbon black include ketjen black, oil furnace black, channel black (that is, gas black), acetylene black, and the like. Also, carbon black with treated surfaces (also referred to as "surface-treated carbon black) may be used as the carbon black.

The surface-treated carbon black can be produced by applying, for example, a carboxyl group, a quinone group, a lactone group, a hydroxyl group, or the like to the surfaces thereof. Examples of a surface treatment method include an air oxidation method of reaction in contact with air in a high-temperature atmosphere, a method of reaction with a nitrogen oxide or ozone at room temperature (for example, 22° C.), a method of oxidation with ozone at a low temperature after air oxidation in a high-temperature atmosphere, and the like.

The carbon blacks are divided into basic carbon black and acidic carbon black depending on the pH value measured by a pH measurement method described later.

Carbon black having a pH value of 7 or more measured by a pH measurement method described later is referred to as "basic carbon black".

On the other hand, carbon black having a pH value of less than 7 measured by a pH measurement method described later is referred to as "acidic carbon black".

From the viewpoint of improving particle dispersibility in the endless belt and thus decreasing the ratio of coarse particles contained in the endless belt, the carbon black is preferably basic carbon black.

The pH of carbon black is a value measured by "the method of measuring pH" specified by JIS 28802 (2011).

The average primary particle diameter of the particles is 8 nm or more and 20 nm or less, and from the viewpoint of more decreasing the ratio of coarse particles contained in the endless belt, the average primary particle diameter is preferably 8 nm or more and 13 nm or less, more preferably 8 nm or more and 11 nm or less, and still more preferably 8 nm or more and 9 nm or less.

The average primary particle diameter of the particles is a value determined by small-angle X-ray scattering (SAXS) measurement.

For example, SmartLab, NANOPIXmini manufactured by Rigaku Corporation or the like can be used as a small-angle X-ray scattering measurement apparatus.

The measurement procedures for the average primary particle diameter of the particles are described below.

A sheet-shaped measurement sample is cut out from the endless belt containing the particles to be measured, filled in a cell of 1 mm in thickness, and sealed with a Kapton film.

The measurement sample is irradiated with X-rays under conditions below, obtaining a two-dimensional scattering image.

The measurement is performed for 5 minutes under room temperature and normal pressure.

-Conditions for Small-Angle X-Ray Scattering Measurement-

Wavelength of X-ray: CuKα 1.5418 Å q range: 0.02 to 2.00 $nm^{-1}$

A volume-based particle size distribution is obtained by analysis of the resultant two-dimensional scattering image using a maximum entropy method (MEM method). Based on the particle size distribution measured, a volume-based cumulative undersize distribution (also referred to as a "cumulative undersize volume distribution" hereinafter) is drawn from the small-diameter side. In the cumulative undersize volume distribution, the particle diameter (that is, median diameter) at a cumulation of 50% is regarded as the average primary particle diameter.

-Particle Size Distribution-

Ratio (Area B/Area A)

In the volume frequency distribution of the particles determined by the small-angle X-ray scattering measurement, the ratio (area B/area A) of graph area B of a particle diameter region of over 35 nm to graph area A of a particle diameter region of 35 nm or less is 0.3 or less, and from the viewpoint of a lower ratio of coarse particles contained in the endless belt, the ratio (area B/area A) is preferably 0.1 or less, more preferably 0.07 or less, and still more preferably 0.05 or less.

The measurement procedures for the ratio (area B/area A) are described below.

First, a particle size distribution of the particles is obtained by small-angle X-ray scattering measurement. A volume-based particle size distribution is obtained according to the same procedures as the procedures described above in "the measurement procedures for the average primary particle diameter of the particles". Based on the measured particle size distribution, a volume frequency distribution is drawn from the small-diameter side. The volume frequency distribution is obtained as a graph in which the ordinate is frequency (unit: %) and the abscissa is the particle diameter (unit: nm). Then, calculation made of the ratio (area B/area A) of graph area B of a particle diameter region of over 35 nm to graph area A of a particle diameter region of 35 nm or less.

Particle Diameter at Maximum Peak in Volume Frequency Distribution

From the viewpoint of a smaller ratio of coarse particles contained in the endless belt, the particle diameter at the maximum peak among the particle diameters at the peaks contained in the graph (volume frequency distribution) is preferably smallest.

Figure 2:
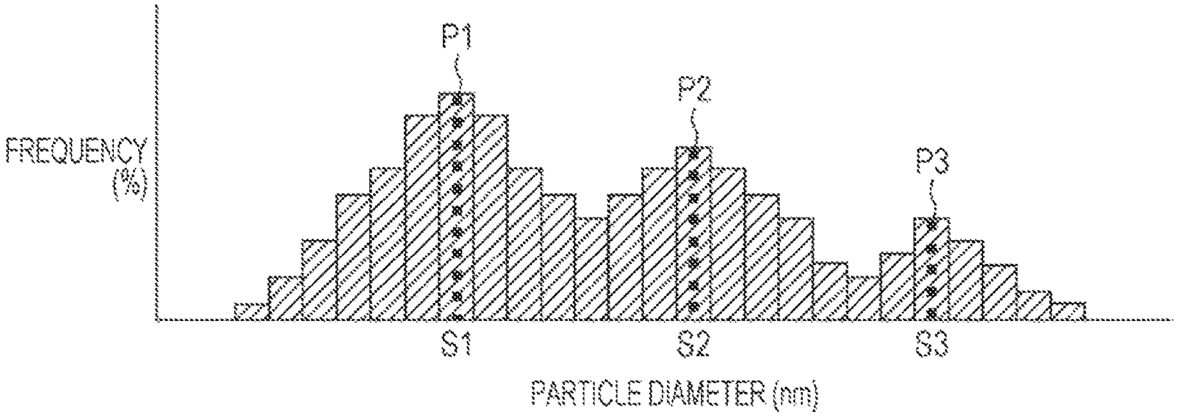
FIG. 2 is a schematic diagram showing an example of a graph (volume frequency distribution).

Herein, the particle diameters at peaks and the particle diameter at the maximum peak are described using FIG. 2 which is an example of the graph (volume frequency distribution).

The particle diameters at peaks represent the particle diameters (S1, S2, and S3 in FIG. 2) at peaks (P1, P2, and P3 in FIG. 2) contained in the graph (volume frequency distribution).

The particle diameter at the maximum peak represents the particle diameter (S1 in FIG. 2) at the peak (P1 in FIG. 2) having the maximum frequency value at the peak among the peaks contained in the graph (volume frequency distribution).

The peaks contained in the graph are the positions showing measured values of frequency larger than the measured values before and after them.

From the viewpoint of a further smaller ratio of coarse particles contained in the endless belt, the average primary particle diameter at the maximum peak is preferably 8 nm or more and 20 nm or less, more preferably 8 nm or more and 15 nm or less, and still more preferably 8 nm or more and 10 nm or less.

Cumulative Undersize Distribution

In the cumulative undersize volume distribution of the particles determined by small-angle X-ray scattering measurement, the ratio of particles having a particle diameter of 35 nm or less is 70% by volume or more, preferably 80% by volume or more, more preferably 90% by volume or more, and still more preferably 95% by volume or more.

In the cumulative undersize volume distribution, the ratio of particles having a particle diameter of 35 nm or less is calculated as follows.

The cumulative undersize volume distribution is drawn according to the same procedures as for measurement of the average primary particle diameter of particles described above. In the cumulative undersize volume distribution, the ratio of particles having a particle diameter of 35 nm or less is calculated.

(Other Components)

The endless belt may contain other components other than the resin and the particles.

Examples of the other components include a conductive agent other than the conductive particles, a filler for improving the strength of the belt, an antioxidant for preventing thermal degradation of the belt, a surfactant for improving fluidity, a heat-resistant anti-aging agent, and the like.

When the endless belt contains the other components, the content of the other components relative to the total mass of the endless belt is preferably over 0% by mass and 10% by mass or less, more preferably over 0% by mass and 5% by mass or less, and still more preferably over 0% by mass and 1% by mass or less.

<Characteristics of Endless Belt>

(Layer Structure)

The endless belt according to the exemplary embodiment is the single-layer type endless belt.

The "single layer" represents not having an interface formed by lamination in the layer. Specifically, it represents a state where an interface by lamination is not observed when a section is observed by a transmission electron microscope.

(Thickness of Endless Belt)

From the viewpoint of mechanical strength of the belt, the thickness is preferably 60 μm or more and 120 μm or less, and more preferably 80 μm or more and 120 μm or less.

The thickness of the endless belt is measured as follows.

That is, the thickness of the endless belt to be measured is measured at 10 positions by observing a section in the thickness direction of the endless belt using an optical microscope or scanning electron microscope, and an average value is regarded as the thickness.

<Method for Producing Endless Belt>

A method for producing the single-layer type endless belt according to the exemplary embodiment includes a first process of preparing a dispersion liquid by dispersing a solution, containing a resin or resin precursor and coarse particles, by a high-pressure collision type disperser; a second process of coating the dispersion liquid on a cylindrical substrate to form a coating film; a third process of drying the coating film formed on the substrate; a fourth process of forming a resin film by heating the dried coating film; and a fifth process of peeling the resin film formed on the substrate from the substrate.

(First Process)

The first process is a process of preparing a dispersion liquid by dispersing a solution, containing a resin or resin precursor and coarse particles, by a high-pressure collision type disperser.

When the dispersion liquid is prepared by dispersing the solution, containing a resin or resin precursor and coarse particles, two or more times under a pressure of 100 MPa or more using a high-pressure collision type disperser, the coarse particles contained in the solution are easily disintegrated. Therefore, the ratio of coarse particles contained in the coarse particles is decreased, and thus the occurrence of local discharge starting from the coarse particles is suppressed.

The value of pressure applied to the solution by the high-pressure collision type disperser is a set value of the high-pressure collision type disperser.

-Solution Containing Resin or Resin Precursor and Coarse Particles-

The resin used in the first process is the same resin as the resin contained in the endless belt described above.

The resin precursor used in the first process is a compound which becomes a resin contained in the endless belt by passing through the first process to the fifth process included in the method for producing the endless belt according to the exemplary embodiment. For example, when the resin contained in the endless belt is a polyimide resin, polyamic acid corresponds to the resin precursor.

The coarse particles become the particles contained in the endless belt according to the exemplary embodiment by passing through the first process to the fifth process.

Examples of the coarse particles include EMPEROR 2000 and MONARCH 1500 manufactured by Cabot Corporation, FW200 and FW285 manufactured by Orion Engineered Carbons Inc., and the like.

The solution containing the resin or resin precursor and the coarse particles preferably contains an organic solvent.

The type of the organic solvent is not particularly limited.

-High-Pressure Collision Type Disperser-

The high-pressure collision type disperser is an apparatus which disperses the pressurized raw materials by collision with each other.

Examples of the high-pressure collision type disperser include Jenus PY manufactured by Jenus Corporation, Nanomizer manufactured by Nanomizer Inc., and the like.

(Second Process)

The second process is a process of coating the dispersion liquid on a cylindrical substrate to form a coating film.

For example, a substrate made of a metal is preferably used as the cylindrical substate. Also, glass coat, ceramic coat, or the like may be provided on the surface of the substrate, and a relating agent such as a silicone-based or fluorine-based releasing agent may be coated.

Before the dispersion liquid is coated, an operation of defoaming the dispersion liquid may be performed. Defoaming the dispersion liquid suppresses the occurrence of foam biting and a defect in the coating film. Examples of a method for defoaming the dispersion liquid include a reduced-pressure method, a centrifugal separation method, and the like, and defoaming in a reduced-pressure state is suitable because of convenience and large defoaming ability.

Examples of a method for coating the dispersion liquid on the cylindrical substrate include a method (spiral coating method) in which the dispersion liquid is moved on the rotated cylindrical substrate in the rotational axis direction while being ejected from nozzles to spirally coat the dispersion liquid on the outer peripheral surface of the cylindrical substrate, a method (blade coating method) in which the dispersion liquid ejected on the substrate surface in the spiral coating method is moved in the rotational axis direction while a blade is pressed, and a dip coating method in which the cylindrical substrate is dipped in the dispersion liquid and then pulled up.

(Third Process)

The third process is a process of drying the coating film formed on the substrate.

The coating film is dried by, for example, evaporating the solvent by heating while rotating a mold. Even when the mold is not rotated, the coating film is dried until the dispersion liquid becomes a state where it does not sag and run.

The third process is, for example, a process of drying the coating film by hot air of 100° C. or more and 200° C. or less.

When the third process is the process described above, aggregation of the coarse particles contained in the coating film is suppressed. Therefore, the ratio of the coarse particles contained in the endless belt is decreased, and thus the occurrence of local discharge starting from the coarse particles is suppressed.

The heating temperature of the coating film in the third process is preferably 105° C. or more 170° C. or less and more preferably 110° C. or more and 135° C. or less.

The heating time of the coating film in the third process is preferably 10 minutes or more 90 minutes or less and more preferably 30 minutes or more and 70 minutes or less.

(Fourth Process)

The fourth process is a process of heating the dried coating film to form a resin film.

In the fourth process, the coating film is preferably heated at a temperature higher than the heating temperature of the coating film in the third process. This accelerates evaporation of the solvent contained in the coating film. Also, the reaction of the resin precursor easily proceeds. For example, when polyamic acid is used as the resin precursor, imidization reaction easily proceeds, thereby easily producing a polyimide resin.

The hating conditions in the fourth process include, for example, 150° C. or more and 450° C. or less (preferably 200° C. or more and 350° C. or less) and 20 minutes or more and 180 minutes or less.

In heating the coating film, heating is preferably performed by increasing the temperature stepwisely or gradually at a constant rate before the final temperature of heating is reached.

When polyamic acid is used as the resin precursor, the heating temperature depends on the type of the raw material used, and from the viewpoint of mechanical characteristics and electrical characteristics, the temperature is preferably set so as to complete imidization.

(Fifth Process)

The fifth process is a process of peeling from the substrate the resin film formed on the substrate.

A method for peeling the resin film from the substrate is not particularly limited, and a known method is applied.

Examples of the method for peeling the resin film from the substrate include a method of pulling out the substrate with the hand, a method of pulling out the substrate after air blowing between the substrate and the resin film, and the like.

The single-layer type endless belt is produced through the processes described above.

After the fifth process, the resin film peeled from the substrate may be cut into any desired width, producing the endless belt (cutting).

<Application of Endless Belt>

Examples of application of the endless belt according to the exemplary embodiment include, but are not particularly limited to, an intermediate transfer belt, a fixing belt, a paper transport belt, and the like in an image forming apparatus.

Also, a belt having a release layer or an elastic layer and a release layer provided in order on the endless belt according to the exemplary embodiment may be used as an intermediate transfer belt, a fixing belt, a paper transport belt, and the like.

The endless belt according to the exemplary embodiment is preferably used as an intermediate transfer belt.

The endless belt according to the exemplary embodiment suppresses local discharge when a voltage is applied, and thus when used as an intermediate transfer belt, transfer defect can be easily suppressed.

A transfer device and image forming apparats using the endless belt according to the exemplary embodiment as an intermediate transfer belt are described below.

<Transfer Device and Image Forming Apparatus>

A transfer device according to an exemplary embodiment of the present disclosure includes an intermediate transfer body (that is, an intermediate transfer belt), a first transfer unit which first transfers a toner image formed on the surface of an image holding member to the surface of the intermediate transfer body, and a second transfer unit which second transfers the toner image transferred to the surface of the intermediate transfer body to a recording medium. The endless belt described above is used as the intermediate transfer body.

An image forming apparatus according to an exemplary embodiment of the present disclosure includes an image holding member, a charging device which charges the surface of the mage holding member, an electrostatic latent image forming device which forms an electrostatic latent image on the charged surface of the image holding member, a developing device which houses a developer containing a toner and develops, with the developer, the electrostatic latent image formed on the surface of the image holding member to form a toner image, and a transfer device which transfers the toner image to the surface of a recording medium. The transfer device described above is used as the transfer device.

An example of the image forming apparatus according to the exemplary embodiment is described below with reference to the drawing.

FIG. 1 is a schematic configuration diagram showing the configuration of the image forming apparatus according to the exemplary embodiment.

The endless belt described above is used as an intermediate transfer belt.

In the image forming apparatus according to the exemplary embodiment, for example, a part containing at least a transfer device may have a cartridge structure (process cartridge) detachable from the image forming apparatus.

As shown in FIG. 1, an image forming apparatus 100 according the exemplary embodiment is, for example, an intermediate transfer-system image forming apparatus generally called a "tandem type", and includes plural image forming units 1Y, 1M, 1C, and 1K which form toner images of respective color components by an electrophotographic system, first transfer parts 10 (that is, first transfer regions) which sequentially transfer (first transfer) the toner images of the respective color components formed by the image forming units 1Y, 1M, 1C, and 1K to an intermediate transfer belt 15, a second transfer part 20 (that is, a second transfer region) which collectively transfers (second transfer) the superposed toner images transferred to the intermediate transfer belt 15 to paper K serving as a recording medium, and a fixing device 60 which fixes the second transferred images to the paper K (an example of the recording medium). Also, the image forming apparatus 100 includes a controller 40 which controls the operation of each of the devices (parts).

Each of the image forming units 1Y, 1M, 1C, and 1K of the image forming apparatus 100 includes, as an example of an image holding member which holds the toner image formed on the surface thereof, a photoreceptor 11 (an example of the image holding member) which is rotated in the direction of arrow A.

A charging unit 12 is provided, as an example of the charging device which charges the photoreceptor 11, around the photoreceptor 11, and a laser exposure unit 13 (in the drawing, an exposure beam is denoted by reference numeral Bm) is provided, as an example of the electrostatic latent image forming device which writes an electrostatic latent image on the photoreceptor 11, above the photoreceptor 11.

In addition, there are provided around the photoreceptor 11 a developing unit 14 as an example of the developing device which houses a toner of each of the color components and visualizes the electrostatic latent image on the photoreceptor 11 with the toner, and a first transfer roller 16 which transfers the toner image of each of the color components formed on the photoreceptor 11 to the intermediate transfer belt 15 in the first transfer part 10.

Further, there is provided around the photoreceptor 11 a photoreceptor cleaner 17 which removes the toner remaining on the photoreceptor 11, and electrophotographic devices such as the charging unit 12, the laser exposure unit 13, the developing unit 14, the first transfer roller 16, and the photoreceptor cleaner 17 are disposed in order along the rotational direction of the photoreceptor 11. The image forming units 1Y, 1M, 1C, and 1K are substantially linearly disposed in the order of yellow (Y), magenta (M), cyan (C), and black (K) from the upstream side of the intermediate transfer belt 15.

The intermediate transfer belt 15 serving as the intermediate transfer body is formed so that the volume resistivity is, for example, $1\times10^{6}\Omega cm$ or more and $1\times10^{14}\Omega cm$ or less, and is configured to have a thickness of about 0.1 mm.

The intermediate transfer belt 15 is circularly driven (rotated) by various rollers at a speed matched with a purpose in direction B shown in FIG. 1. The various rollers include a drive roller 31 which is driven by a motor (not shown) having an excellent constant speed property to rotate the intermediate transfer belt 15, a support roller 32 which supports the intermediate transfer belt 15 extending substantially linearly along the arrangement direction of the photoreceptors 11, a tension-applying roller 33 functioning as a correction roller which applies tension to the intermediate transfer belt 15 and prevents meandering of the intermediate transfer belt 15, a back roller 25 provided in the second transfer part 20, and a cleaning back roller 34 provided in the cleaning part which scrapes the toner remaining on the intermediate transfer belt 15.

Each of the first transfer parts 10 includes a first transfer roller 16 disposed to face the photoreceptor 11 with the intermediate transfer belt 15 disposed therebetween. The first transfer roller 16 is disposed in pressure contact with the photoreceptor 11 with the intermediate transfer belt 15 disposed therebetween, and further a voltage (first transfer bias) with polarity opposite to the charging polarity (minus polarity, this also applies below) of the toner is applied to the first transfer roller 16. Therefore, the toner images on the photoreceptors 11 are sequentially electrostatically attracted to the intermediate transfer belt 15, thereby forming superposed toner images on the intermediate transfer belt 15.

The second transfer part 20 is configured to include a back roller 25 and a second transfer roller 22 disposed on the toner image holding surface side of the intermediate transfer belt 15.

The back roller 25 is formed to have a surface resistivity of $1\times10^{7}\Omega/\square$ or more and $1\times10^{10}\Omega/\square$ less, and the hardness is set to, for example, 70° (Asker C, manufactured by Kobunshi Keiki Co., Ltd., this also applies below). The back roller 25 is disposed on the back surface side of the intermediate transfer belt 15 to configure a counter electrode of the second transfer roller 22, and a metal-made power supply roller 26, to which the second transfer bias is stably applied, is disposed in contact with the back roller 25.

On the other hand, the second transfer roller 22 is a cylindrical roller having a volume resistivity of $10^{7.5}$ Ωcm or more and $10^{8.5}$ Ωcm or less. The second transfer roller 22 is disposed in pressure contact with the back roller 25 with the intermediate transfer belt 15 disposed therebetween, and further the second transfer roller 22 is earthed to form a second transfer bias between the second transfer roller 22 and the back roller 25 so that the toner image is second transferred to the paper K transported to the second transfer part 20.

In addition, the transport speed of the paper K to the second transfer part 20 is, for example, within a range of 50 mm/s or more and 60 mm/s or less.

Further, an intermediate transfer belt cleaner 35 which removes the remaining toner and paper dust on the intermediate transfer belt 15 after second transfer and cleans the surface of the intermediate transfer belt 15 is detachably provided downstream the second transfer part 20 on the intermediate transfer belt 15.

The intermediate transfer belt 15, the first transfer parts 10 (the first transfer rollers 16), and the second transfer part 20 (the second transfer roller 22) correspond to an example of the transfer device.

On the other hand, a reference sensor (home position sensor) 42 which generates a reference signal serving as a reference for image formation timing in each of the image forming units 1Y, 1M, 1C, and 1K is disposed upstream the image forming unit 1Y of yellow. Also, an image density sensor 43 for adjusting image quality is disposed downstream the black image forming unit 1K. The reference sensor 42 is configured to recognize a mark provided on the back surface of the intermediate transfer belt 15 and generate a reference signal so that each of the image forming units 1Y, 1M, 1C, and 1K starts image formation by instruction from the controller 40 based on the recognition of the reference signal.

Further, the image forming apparatus according to the exemplary embodiment includes, as a transport unit which transports the paper K, a paper housing part 50 which houses the paper K, a paper feed roller 51 which takes out and transports the paper K accumulated in the paper housing part 50 with predetermined timing, transport rollers 52 which transport the paper K delivered by the paper feed roller 51, a transport guide 53 which sends the paper K transported by the transport rollers 52 to the second transfer part 20, a transport belt 55 which transports, to the fixing device 60, the paper K transported after second transfer by the second transfer roller 22, and a fixing inlet guide 56 which guides the paper K to the fixing device 60.

Next, the fundamental image formation processes of the image forming apparatus according to the exemplary embodiment are described.

In the image forming apparatus according to the exemplary embodiment, image data output from an image reading device (not shown), a personal computer PC (not shown), or the like is subjected to image processing by an image processing device (not shown), and then an image forming work is executed by the image forming units 1Y, 1M, 1C, and 1K.

In the image processing device, the input reflectance data is subjected to image processing such as shading correction, misregistration correction, brightness/color space conversion, gamma correction, frame release, and various image editing such as color editing, movement editing, and the like. The image data subjected to image processing is converted to color material tone data of the four colors of Y, M, C, and K and then output to the laser exposure unit 13.

In the laser exposure unit 13, the photoreceptor 11 of each of the image forming units 1Y, 1M, 1C, and 1K is irradiated with the exposure beam Bm emitted from, for example, a semiconductor laser, according to the input color material tone data. After the photoreceptor 11 of each of the image forming units 1Y, 1M, 1C, and 1*k* is charged by the charging unit 12, the surface thereof is scanned and exposed to light by the laser exposure unit 13 to form an electrostatic latent image. The formed electrostatic latent image is developed as a toner image of each of Y, M, C, and K colors by each of the image forming units 1Y, 1M, 1C, and 1K.

The toner image formed on the photoreceptor 11 of each of the image forming units 1Y, 1M, 1C, and 1K is transferred to the intermediate transfer belt 15 at the first transfer part 10 in which the photoreceptor 11 is in contact with the intermediate transfer belt 15. More specifically, in the first transfer part 10, a voltage (first transfer bias) with polarity opposite to the charging polarity (minus polarity) of the toner is applied to the substrate of the intermediate transfer belt 15 by the first transfer roller 16, and the toner images are first transferred to be sequentially superposed on the surface of the intermediate transfer belt 15.

After the toner images are sequentially first transferred to the surface of the intermediate transfer belt 15, the intermediate transfer belt 15 is moved, and the toner images are transported to the second transfer part 20. When the toner images are transported to the second transfer part 20, in the transport unit, the paper feed roller 51 is rotated in coincidence with transport timing of the toner images to the second transfer part 20, and the paper K of the intended size is supplied from the paper housing part 50. The paper K supplied by the paper feed roller 51 is transported by the transport rollers 52 and reaches the second transfer part 20 through the transport guide 53. The paper K is once stopped before reaching the second transfer part 20, and a position alignment roller (not shown) is rotated in coincidence with the timing of movement of the intermediate transfer belt 15 holding the toner images, thereby aligning the position of the paper K with the position of the toner images. For example, even when paper having an uneven surface, such as embossed paper or the like, is used as the paper K, good transferability to the paper K can be achieved.

In the second transfer part 20, the second transfer roller 22 is pressed by the back roller 25 through the intermediate transfer belt 15. At this time, the paper K transported in coincidence with timing is held between the intermediate transfer belt 15 and the second transfer roller 22. In this case, a voltage (second transfer bias) with the same polarity as the charging polarity (minus polarity) of the toner is applied from the power supply roller 26, and thus a transfer electric field is formed between the second transfer roller 22 and the back roller 25. Then, the unfixed toner images held on the intermediate transfer belt 15 are collectively electrostatically transferred to the paper K in the second transfer part 20 pressurized by the second transfer roller 22 and the back roller 25.

Then, the paper K, to which the toner images have been electrostatically transferred, is peeled off from the intermediate transfer belt 15 by the second transfer roller 22, and in this state, the paper K is transported as it is to the transport belt 55 provided downstream the second transport roller 22 in the paper transport direction. In the transport belt 55, the paper K is transported to the fixing device 60 in accordance with the optimum transport speed in the fixing device 60. The unfixed toner images on the paper K transported to the fixing device 60 are fixed to the paper K by fixing treatment with heat and pressure in the fixing device 60. The paper K having the fixed image formed thereon is transported to an ejected paper housing part (not shown) provided in the discharge part of the image forming apparatus.

On the other hand, the residual toner remaining on the intermediate transfer belt 15 after the completion of transfer to the paper K is transported to the cleaning part in association with the rotation of the intermediate transfer belt 15 and removed from the intermediate transfer belt 15 by the cleaning back roller 34 and the intermediate transfer belt cleaner 35.

The exemplary embodiments of the present disclosure are described above, but the present disclosure is not exclusively interrupted by the exemplary embodiments, and various modifications, changes, and improvements can be made.

EXAMPLES

Examples of the present disclosure are described below, but the present disclosure is not limited to the examples below. In description below, "parts" and "%" are all on mass basis unless otherwise specified.

Example 1

(First Process)

A specific solution as a solution (also referred to as a "specific solution" hereinafter) containing a resin or resin precursor and coarse particles is prepared by adding 11 parts by mass of basic carbon black (EMPEROR 2000 manufactured by Cabot Corporation, average primary particle diameter: 9 nm) as coarse particles to relative to 100 parts by mass of the solid content of polyamic acid of polyimide varnish (JIV300R manufactured by JFE Chemical Corporation, solid content ratio: 18% by mass), which is a solution containing a resin or resin precursor. The prepared specific solution is dispersed by a high-pressure collision type disperser, producing a dispersion liquid.

(Second Process)

An aluminum-made cylindrical body having an outer diameter of 366 mm and a length of 600 mm is prepared as a cylindrical substrate. The dispersion liquid is ejected with a width of 500 mm to a thickness of 80 μm on the outer peripheral surface of the cylindrical body through a dispenser.

(Third Process)

The coating film is dried by heating at 110° C. for 67 minutes while the cylindrical body having the coating film formed thereon is maintained in a horizontal position.

(Fourth Process)

The dried coating film is heated for 120 minutes so that the maximum temperature is 320° C., forming a resin film.

(Fifth Process)

The resin film is peeled off from the substrate by pulling out the substrate with the hand.

(Cutting Process)

A central portion in the axial direction of the resin film is cut into a width of 363 mm, producing an endless belt.

Example 2

An endless belt is produced by the same method as in Example 1 except that in preparing a specific solution in the first process, the coarse particles are changed to acidic carbon black (MONARCH 1500manufactured by Cabot Corporation, average primary particle diameter: 9 nm), and the adding amount of coarse particles (acidic carbon black) relative to 100 parts by mass of the resin solid content (polyamic acid) is 9 parts by mass.

Example 3

An endless belt is produced by the same method as in Example 1 except that in preparing a specific solution in the first process, the coarse particles are changed to acidic carbon black (FW200, manufactured by Orion Engineered Carbons, Inc., average primary particle diameter: 13 nm), and the adding amount of coarse particles (acidic carbon black) relative to 100 parts by mass of the resin solid content (polyamic acid) is 20 parts by mass.

Example 4

An endless belt is produced by the same method as in Example 3 except that in Example 3, the adding amount of coarse particles relative to 100 parts by mass of the resin solid content (polyamic acid) is 24 parts by mass.

Example 5

An endless belt is produced by the same method as in Example 1 except that in preparing a specific solution in the first process, the solution containing a resin or resin precursor is changed to a polyamide-imide varnish (HPC9000F manufactured by Showa Denko K. K., solid content ratio: 21%), and the adding amount of coarse particles (basic carbon black) relative to 100 parts by mass of the resin solid content (polyamide-imide resin) is 10 parts by mass.

Example 6

An endless belt is produced by the same method as in Example 1 except that in preparing a specific solution in the first process, the coarse particles are changed to gold nanoparticles (900473 manufactured by Sigma-Aldrich Co. Ltd., average primary particle diameter: 10 nm), and the adding amount of coarse particles (gold nanoparticles) relative to 100 parts by mass of the resin solid content (polyamic acid) is 10 parts by mass.

Example 7

An endless belt is produced by the same method as in Example 1 except that in preparing a specific solution in the first process, the coarse particles are changed to acidic carbon black (FW200 manufactured by Orion Engineered Carbons, Inc., average primary particle diameter: 13 nm), and the adding amount of coarse particles (acidic carbon black) relative to 100 parts by mass of the resin solid content (polyamic acid) is 22 parts by mass.

Example 8

An endless belt is produced by the same method as in Example 1 except that in preparing a specific solution in the first process, the coarse particles are changed to acidic carbon black (Special Black 6 (SB6)manufactured by Orion Engineered Carbons, Inc., average primary particle diameter: 17 nm), and the adding amount of coarse particles (acidic carbon black) relative to 100 parts by mass of the resin solid content (polyamic acid) is 22 parts by mass.

Example 9

An endless belt is produced by the same method as in Example 8 except that in Example 8, the adding amount of coarse particles relative to 100 parts by mass of the resin solid content (polyamic acid) is 24 parts by mass.

Example 10

An endless belt is produced by the same method as in Example 1 except that the adding amount of coarse particles (basic carbon black) relative to 100 parts by mass of the resin solid content (polyamic acid) is 10 parts by mass.

Example 11

An endless belt is produced by the same method as in Example 1 except that in preparing a specific solution in the first process, the coarse particles are changed to acidic carbon black (FW200 manufactured by Orion Engineered Carbons, Inc., average primary particle diameter: 13 nm), and the adding amount of coarse particles (acidic carbon black) relative to 100 parts by mass of the resin solid content (polyamic acid) is 19 parts by mass.

Comparative Example 1

An endless belt is produced by the same method as in Example 1 except that in preparing a specific solution in the first process, the coarse particles are changed to acidic carbon black (Special Black 4 (SB4) manufactured by Orion Engineered Carbons, Inc., average primary particle diameter: 25 nm), and the adding amount of coarse particles (acidic carbon black) relative to 100 parts by mass of the resin solid content (polyamic acid) is 30 parts by mass.

Comparative Example 2

An endless belt is produced by the same method as in Example 1 except that in preparing a specific solution in the first process, the solution containing a resin or resin precursor is changed to polyethersulfone varnish prepared so that the solid content ratio of polyethersulfone (Veradel 3100 manufactured by Solvay Co., Ltd.,) is 18% by mass, and the adding amount of coarse particles (basic carbon black) relative to 100 parts by mass of the resin solid content (polyethersulfone) is 9 parts by mass.

Comparative Example 3

An endless belt is produced by the same method as in Example 1 except that in preparing a specific solution in the first process, the coarse particles are changed to metal oxide: indium tin oxide (790346 manufactured by Sigma-Aldrich Co., Ltd., average primary particle diameter: 30 nm), and the adding amount of coarse particles (metal oxide) relative to 100 parts by mass of the resin solid content (polyamic acid) is 30 parts by mass.

Comparative Example 4

An endless belt is produced by the same method as in Comparative Example 1 except that in Comparative Example 1, the adding amount of coarse particles relative to 100 parts by mass of the resin solid content (polyamic acid) is 25 parts by mass.

<Evaluation>

(Measurement of Particle Size Distribution)

The volume frequency distribution and cumulative undersize volume distribution of particles of the endless belt produced in each of the examples are determined according to the procedures described above.

The "ratio (area B/area A)", "particle diameters at peaks contained in graph" and "particle diameter at maximum peak" are calculated from the resultant volume frequency distribution according to the procedures described above.

Also, the "ratio of particles having particle diameter of 35 nm or less" is calculated from the resultant cumulative undersize volume distribution according to the procedures described above.

(Evaluation of Local Discharge Suppressing Effect)

With respect to the endless belt according to the exemplary embodiment, an electrode is disposed at a position at a distance of 60 μm from the outer peripheral surface of the belt, and a voltage is applied to the electrode. Then, the cumulative discharge amount (simply referred to as the "discharge amount" hereinafter) is measured for 1 second after the voltage reaches 1300 V. The local discharge suppressing effect is evaluated according to evaluation criteria below.

When a voltage is applied to the endless belt, a current flowing to the electrode at a distance from the surface of the endless belt causes local discharge from the endless belt. Therefore, a lower measured value of current indicates that local discharge from the endless belt is suppressed.

-Evaluation Criteria-

A: The discharge amount is less than 110 μC.

B: The discharge amount is 110 μC or more and less than 150 μC.

C: The discharge amount is 150 μC or more and less than 300 μC.

D: The discharge amount is 300 μC or more.

(Evaluation of Endless Belt)

-Evaluation of Transferability to Uneven Paper-

The endless belt produced in each of the examples is incorporated as an intermediate transfer belt into a modified machine of "DocuColor-7171P" manufactured by Fujifilm Business Innovation Corp. (that is, a modified machine in which the intermediate transfer belt is attached and then the cleaning blade is adjusted according to the film thickness of the belt), and a blue color solid image is formed on embossed paper (Leathac 66, 204 gsm) in an environment at a temperature of 22° C. and a humidity of 55% RH under the condition in which the transport speed of a recording medium in a second transfer region is 366 mm/s. Then, void in a recessed portion is visually evaluated.

-Evaluation Criteria-

A: No void occurs.

B: Slight color variation occurs.

C: No clear color variation occurs, but larger color variation than criterion B occurs.

D: Clear color variation and void occur.

TABLE 1

| | First process Specific solution | | | | |
|---|---|---|---|---|---|
| | Solution containing resin or resin precursor | | Coarse particle | | Adding amount (parts by mass) of coarse |
| | Product name | Resin or resin precursor contained in solution | Product name | Material of coarse particle | particle relative to 100 parts by mass of resin solid content |
| Example 1 | JIV300R | Polyamic acid | EMPEROR2000 | Basic CB | 11 |
| Example 2 | JIV300R | Polyamic acid | MONARCH1500 | Acidic CB | 9 |
| Example 3 | JIV300R | Polyamic acid | FW200 | Acidic CB | 20 |
| Example 4 | JIV300R | Polyamic acid | FW200 | Acidic CB | 24 |
| Comparative Example 1 | JIV300R | Polyamic acid | SB4 | Acidic CB | 30 |
| Example 5 | HPC9000F | Polyamide-imide | EMPEROR2000 | Basic CB | 9 |
| Example 6 | JIV300R | Polyamic acid | 900473 manufactured by Sigma-Aldrich Co., Ltd. | Gold nanoparticle | 10 |
| Comparative Example 2 | Veradel PESU3100 | Polyethersulfone | EMPEROR2000 | Basic CB | 9 |
| Comparative Example 3 | JIV300R | Polyamic acid | 790346 manufactured by Sigma-Aldrich Co., Ltd. | Metal oxide | 30 |
| Example 7 | JIV300R | Polyamic acid | FW200 | Acidic CB | 22 |
| Example 8 | JIV300R | Polyamic acid | SB6 | Acidic CB | 22 |
| Example 9 | JIV300R | Polyamic acid | SB6 | Acidic CB | 24 |
| Example 10 | JIV300R | Polyamic acid | EMPEROR2000 | Basic CB | 10 |
| Example 11 | JIV300R | Polyamic acid | FW200 | Acidic CB | 19 |
| Comparative Example 4 | JIV300R | Polyamic acid | SB4 | Acidic CB | 25 |

| | | Particle | | Particle size distribution | | | | Evaluation | |
|---|---|---|---|---|---|---|---|---|---|
| | Resin Type of resin | Average primary particle diameter (nm) | Material of particle | Ratio (area B/area A) | Particle diameters at peaks contained in graph (nm) | Particle diameter at maximum peak (nm) | Ratio (% by volume) of particle having particle diameter of 35 nm or less | Local discharge suppressing effect | Evaluation of transferability |
| Example 1 | Polyimide | 9 | Basic CB | 0.02 | 9,20,32 | 9 | 98 | A | A |
| Example 2 | Polyimide | 9 | Acidic CB | 0.04 | 10,20,34 | 10 | 96 | B | B |
| Example 3 | Polyimide | 13 | Acidic CB | 0.07 | 10,20,30 | 20 | 93 | B | B |
| Example 4 | Polyimide | 13 | Acidic CB | 0.25 | 10,21,32 | 21 | 75 | B | C |
| Comparative Example 1 | Polyimide | 25 | Acidic CB | 0.55 | 21,42,60,80 | 42 | 45 | D | D |
| Example 5 | Polyamide-imide | 9 | Basic CB | 0.03 | 10,20,32 | 10 | 97 | A | B |
| Example 6 | Polyimide | 10 | Gold nanoparticle | 0.29 | 11,20,34 | 11 | 71 | C | C |
| Comparative Example 2 | Polyethersulfone | 9 | Basic CB | 0.4 | 9,25,40,50 | 40 | 60 | D | D |
| Comparative Example 3 | Polyimide | 30 | Metal oxide | 0.63 | 25,50,70 | 50 | 37 | D | D |
| Example 7 | Polyimide | 13 | Acidic CB | 0.2 | 10,20,32 | 20 | 80 | B | B |
| Example 8 | Polyimide | 17 | Acidic CB | 0.28 | 17,35,55,70 | 17 | 72 | C | C |
| Example 9 | Polyimide | 17 | Acidic CB | 0.29 | 21,36,58,71 | 21 | 71 | C | C |
| Example 10 | Polyimide | 9 | Basic CB | 0.02 | 9,20,32 | 9 | 98 | A | A |
| Example 11 | Polyimide | 13 | Acidic CB | 0.15 | 10,20,31 | 20 | 85 | B | C |
| Comparative Example 4 | Polyimide | 25 | Acidic CB | 0.54 | 20,40,59,80 | 40 | 46 | D | D |

An abbreviation in the tables is shown below.

CB: Carbon Black

The results described above indicate that the endless belts of the examples suppress local discharge when a voltage is applied.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An endless belt comprising:

a resin; and particles having an average primary particle diameter of 8 nm or more and 20 nm or less, wherein in a volume frequency distribution of the particles determined by small-angle X-ray scattering measurement, the ratio (area B/area A) of graph area B of a particle diameter region of over 35 nm to graph area A of a particle diameter region of 35 nm or less is 0.3 or less.

2. The endless belt according to claim 1, wherein the resin contains a polyimide resin.

3. The endless belt according to claim 1, wherein the ratio (area B/area A) is 0 or more and 0.05 or less.

4. The endless belt according to claim 2, wherein the ratio (area B/area A) is 0 or more and 0.05 or less.

5. The endless belt according to claim 1, wherein the particles are conductive particles.

6. The endless belt according to claim 2, wherein the particles are conductive particles.

7. The endless belt according to claim 3, wherein the particles are conductive particles.

8. The endless belt according to claim 4, wherein the particles are conductive particles.

9. The endless belt according to claim 5, wherein the conductive particles contain carbon black.

10. The endless belt according to claim 6, wherein the conductive particles contain carbon black.

11. The endless belt according to claim 7, wherein the conductive particles contain carbon black.

12. The endless belt according to claim 8, wherein the conductive particles contain carbon black.

13. The endless belt according to claim 9, wherein the carbon black is basic carbon black.

14. The endless belt according to claim 10, wherein the carbon black is basic carbon black.

15. The endless belt according to claim 11, wherein the carbon black is basic carbon black.

16. The endless belt according to claim 1, wherein among the particle diameters at peaks contained in the graph, the particle diameter at the maximum peak is smallest.

17. The endless belt according to claim 16, wherein the particle diameter at the maximum peak is 8 nm or more and 20 nm or less.

18. A single-layer type endless belt comprising:

a resin; and particles having an average primary particle diameter of 8 nm or more and 20 nm or less, wherein in a cumulative undersize volume distribution of the particles determined by small-angle X-ray scattering measurement, the ratio of the particles having a particle diameter of 35 nm or less is 70% by volume or more.

19. A transfer device comprising:

an intermediate transfer body that is the endless belt according to claim 1;

a first transfer unit that first transfers a toner image formed on the surface of an image holding member to the surface of the intermediate transfer body; and a second transfer unit that second transfers the toner image transferred to the surface of the intermediate transfer body to the surface of a recording medium.

20. An image forming apparatus comprising:

an image holding member;

a charging device that charges the surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to form a toner image; and the transfer device according to claim 19 that transfers the toner image to the surface of a recording medium.

* * * * *